Patented July 14, 1942

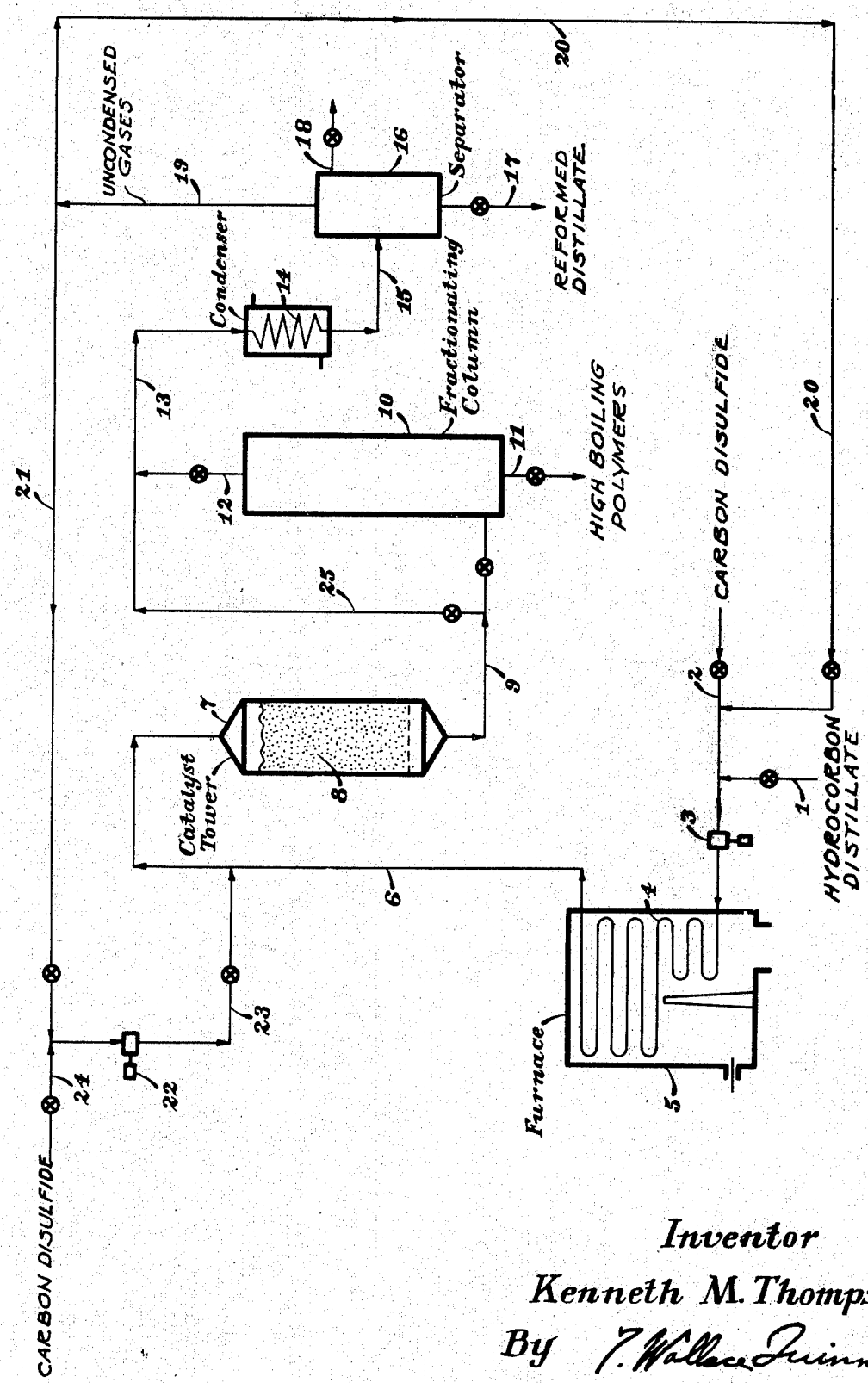

2,289,530

UNITED STATES PATENT OFFICE 2,289,530

TREATMENT OF HYDROCARBON OILS

Kenneth M. Thompson, Aldan, Pa., assignor to The Atlantic Refining Company, Philadelphia, Pa., a corporation of Pennsylvania Application March 11, 1940, Serial No. 323,275

7 Claims. (Cl. 196—52)

The present invention relates to the treatment of hydrocarbons for the purpose of producing therefrom an improved type of motor fuel. In its more specific aspects, the present invention relates to the treatment of hydrocarbons of the gasoline type to convert the same into gasoline having improved anti-knock qualities.

In accordance with the present invention, gasoline distillates having a boiling range of the order of 100° F. to 400° F., or heavy naphthas commonly designated as "reformer stocks," are subjected to a reforming treatment for the improvement of the anti-knock qualities thereof. Such treatment comprises essentially a thermal reforming operation wherein the hydrocarbon distillate is brought into contact, at elevated temperatures, with a reforming catalyst in the presence of added quantities of carbon disulfide for a period of time sufficient to increase the anti-knock value of the distillate to a substantial extent. The thermal treatment may be effected at temperatures of from about 750° F. to about 1200° F., and preferably at from about 900° F. to about 1000° F. Reforming catalysts of the nature of adsorbent earths, such as fuller's earth, are preferred, although other agents such as acid activated clays, bentonite, bauxite, silica gel, synthetic silicates, and the like may be utilized. The quantity of carbon disulfide employed may vary from about 0.1 to about 10% by weight of the hydrocarbon distillate, the preferred amount being from about 0.2% to about 3% by weight. The improved distillate from the reforming operation may be rerun and/or otherwise treated to obtain a motor fuel of desired boiling range having a substantially reduced content of sulfur compounds, gum-forming constituents, and the like.

My invention may be further understood with reference to the accompanying drawing, which represents diagrammatically a system suitable for carrying out my process.

The hydrocarbon distillate to be treated, and the desired quantity of $CS_2$ may be simultaneously supplied to pump 3 by means of valve-controlled pipes 1 and 2, respectively. The mixture of distillate and $CS_2$ is forced through the heating coil 4 disposed in furnace 5, wherein the temperature of the mixture is raised to about 1000° F., and the heated mixture is passed through pipe 6 into a catalytic treatment tower 7 containing a bed of granular catalyst 8 such as 4-8 mesh fuller's earth. The operating pressure within the heating coil 4 and the catalytic tower 7 may vary from slightly superatmospheric up to pressures of the order of 3000 lbs./sq. in. The heated mixture is passed through the catalyst bed at a temperature of the order of 1000° F. and reforming of the distillate therein takes place. As a result of the reforming reaction, molecular rearrangement of the hydrocarbons comprising the distillate occurs, with the evolution of gases including $H_2S$. The mixture resulting from the reforming reaction, including reformed distillate, traces of unreacted $CS_2$, and byproducts of the reaction is withdrawn from the bottom of tower 7 and passed through valve-controlled pipe 9 into fractionating column 10, wherein the distillate may be separated from small amounts of high boiling polymers resulting from the catalytic treatment. Such polymers may be removed from the bottom of column 10 by means of valve-controlled pipe 11, while the reformed hydrocarbon distillate of desired boiling range and gaseous reaction products may be withdrawn from the top of the column 10 in a vaporous state. The vapors and gases may be conducted by valve-controlled pipe 12 and pipe 13 to condenser 14 wherein the hydrocarbon vapors are condensed, and the liquid condensate and uncondensed gases are passed by pipe 15 into separator 16. In separator 16 the condensate, i. e., the reformed hydrocarbon distillate, is separated from the uncondensed gases and is withdrawn therefrom by means of valve-controlled pipe 17. Such reformed distillate may be treated for the removal of acid gases such as $H_2S$ by neutralization with caustic soda solution and water washing, the resulting distillate being a motor fuel of improved anti-knock value.

The uncondensed gases accumulating in the upper portion of separator 16 may be vented by means of valve-controlled pipe 18, or may be recirculated to the thermal reforming system by one or both of the following procedures. Or, a portion of the gases may be vented and the remainder may be recirculated. Uncondensed gases may be withdrawn from the top of separator 16 through pipe 19 and passed by valve-controlled pipe 20 to the inlet side of pump 3 for recirculation through the heating coil 4. Or, the uncondensed gases may be passed through pipe 19 and valve-controlled pipe 21 to pump 22, and forced thereby through valve-controlled pipe 23 into pipe 6 carrying heated hydrocarbon distillate from coil 4 to catalytic tower 7. If desired, I may introduce untreated distillate from valve-controlled pipe 1 into the heating coil 4 without simultaneous introduction of $CS_2$ through valve-controlled pipe 2. In this case I may supply $CS_2$ through valve-controlled pipe 24, pump 22, and valve-controlled pipe 23 to the heated distillate passing through pipe 6 to the catalyst tower 7.

In the above operation, I have described the use of fractionating column 10 for separating high boiling polymers from the reformed distillate. As an alternative procedure, I may eliminate the use of column 10, and by-pass the heated, reformed distillate and gases through valve-controlled pipe 25, and pipe 13 to condenser 14, and thereafter separate the condensed distillate from the uncondensed gases in separator 16. In this case the condensate removed from the separator through valve-controlled pipe 17 may be neutralized and washed to remove acid gases and sulfur compounds, and may thereafter be rerun in suitable distillation equipment to remove high boiling polymers and produce a motor fuel of proper boiling range and improved anti-knock quality.

My invention may be further illustrated by the following examples, which include runs made with fuller's earth and CS₂, fuller's earth without fuller's earth and CS₂, fuller's earth with hydrocarbon distillate employed had a boiling range of 120° F. to 335° F., an A. P. I. gravity of 59.8°, an anti-knock or octane value of 57, and a sulfur content of 0.057%. The treatment comprised vaporizing the untreated distillate, passing the vapors at substantially atmospheric pressure through a bed of 4-8 mesh fuller's earth maintained at a temperature of the order of 990° F. to 1000° F., condensing the vapors, washing the raw condensate with caustic soda solution and with water, and thereafter rerunning the raw condensate, without fractionation, to produce a finished gasoline having a 320° F. distillation end point.

prises intimately contacting said distillate, in the presence of added carbon bisulfide and in the absence of hydrogen introduced from an extraneous source, with an incombustible solid adsorbent reforming catalyst at a temperature within the range of from about 750° F. to about 1200° F.

2. The method of reforming petroleum distillate comprising hydrocarbons boiling substantially within the gasoline boiling range to improve the anti-knock quality thereof, which comprises intimately contacting said distillate, in the presence of added carbon bisulfide and in the absence of hydrogen introduced from an extraneous source, with an incombustible solid adsorbent reforming catalyst at a temperature within the range of from about 750° F. to about 1200° F., and separating from the treated distillate a gasoline fraction of improved anti-knock quality.

3. The method of reforming petroleum distillate comprising hydrocarbons boiling substantially within the gasoline boiling range to improve the anti-knock quality thereof, which comprises intimately contacting said distillate, in the presence of from about 0.1% to about 10% by weight of carbon bisulfide and in the absence of hydrogen introduced from an extraneous source, with an incombustible solid adsorbent reforming catalyst at a temperature within the range of from about 750° F. to about 1200° F.

4. The method of reforming petroleum distillate comprising hydrocarbons boiling substantially within the gasoline boiling range to improve the anti-knock quality thereof, which comprises intimately contacting said distillate, in the presence of from about 0.1% to about 10% by weight of carbon bisulfide and in the absence of hydrogen introduced from an extraneous source, with an argillaceous reforming catalyst at a tem-

| Catalyst | Treatment | | | Treated distillate | | | |
|---|---|---|---|---|---|---|---|
| | Weight percent CS₂ | Temp. | Contact time | Yield (raw) | Yield 320° F. end point | Octane value | Sulfur |
| | | °F. | Seconds | Percent | Percent | | Percent |
| None | | 1,000 | 2.9 | 98.0 | 97.0 | 57 | 1.92 |
| Fuller's earth | 0.0 | 995 | 3.0 | 96.0 | 95.0 | 58.5 | 0.013 |
| Do | 0.1 | 1,000 | 3.2 | 92.0 | 91.7 | 61 | 0.024 |
| Do | 0.2 | 996 | 3.1 | 92.4 | 89.0 | 62.7 | 0.022 |
| Do | 0.34 | 1,000 | 3.1 | 87.0 | 84.4 | 64.3 | 0.050 |
| Do | 2.64 | 995 | 3.0 | 84.0 | 80.0 | 65.5 | 0.115 |
| Do | 7.1 | 1,000 | 2.9 | 80.0 | 76.5 | 68.8 | 0.868 |
| Do | 7.5 | 1,000 | 9.5 | 66.4 | 61.6 | 74.4 | 0.650 |

From the above results, it will be seen that in accordance with my invention, I am able to effect a substantial increase in octane value over that obtainable by the use of either CS₂ or fuller's earth, per se.

While, hereinabove, I have shown the treatment of a relatively light gasoline distillate, it is to be understood that my invention is equally well adapted to the treatment of higher boiling gasoline distillates or naphthas having distillation end points up to about 450° F. The hydrocarbon distillates I prefer to treat comprise hydrocarbons boiling substantially within the gasoline boiling range, i. e., from about 100° F. to about 400° F., and which may be produced by distillation, cracking, hydrogenation, polymerization, or alkylation of petroleum hydrocarbons.

What I claim is:

1. The method of reforming petroleum distillate comprising hydrocarbons boiling substantially within the gasoline boiling range to improve the anti-knock quality thereof, which comperature within the range of from about 750° F. to about 1200° F.

5. The method of reforming petroleum distillate comprising hydrocarbons boiling substantially within the gasoline boiling range to improve the anti-knock quality thereof, which comprises intimately contacting said distillate, in the presence of from about 0.1% to about 10% by weight of carbon bisulfide and in the absence of hydrogen introduced from an extraneous source, with fuller's earth at a temperature within the range of from about 750° F. to about 1200° F.

6. The method of reforming petroleum distillate comprising hydrocarbons boiling substantially within the gasoline boiling range to improve the anti-knock quality thereof, which comprises intimately contacting said distillate, in the presence of from about 0.2% to about 3.0% by weight of carbon bisulfide and in the absence of hydrogen introduced from an extraneous source, with fuller's earth at a temperature of from about 900° F. to about 1000° F.

7. The method of reforming petroleum distillate comprising hydrocarbons boiling substantially within the gasoline boiling range to improve the anti-knock quality thereof, which comprises intimately contacting said distillate, in the presence of from about 0.2% to about 3.0% by weight of carbon bisulfide and in the absence of hydrogen introduced from an extraneous source, with fuller's earth at a temperature of from about 900° F. to about 1000° F., and separating from the treated distillate a gasoline fraction of improved anti-knock quality.

KENNETH M. THOMPSON.